Figure 1:
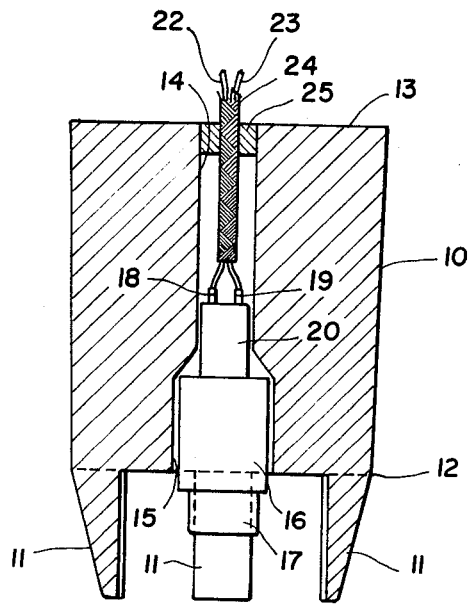

INVENTOR.
ALBIN E. SCHRAEDER
BY
his ATTORNEY

United States Patent Office 3,347,099
Patented Oct. 17, 1967

3,347,099
MOLTEN BATH TEMPERATURE
MEASUREMENT
Albin E. Schraeder, Glassport, Pa., assignor to Jones & Laughlin Steel Corporation, Pittsburgh, Pa., a corporation of Pennsylvania
Filed Apr. 27, 1965, Ser. No. 451,240
5 Claims. (Cl. 73—359)

This invention is concerned with method and apparatus for measuring the temperature of a molten bath. It is more particularly concerned with method and apparatus for measuring the temperature below the surface of a relatively inaccessible bath of molten metal, such as steel in a converter furnace. My invention is described hereinafter as applied to the measurement of the temperature of molten steel in a basic oxygen steelmaking furnace, but it is also advantageous for the measurement of temperatures of molten baths of other high melting point substances.

The temperature of molten steel in a basic oxygen steelmaking furnace near the end of its blowing period approaches 3,000° F. Such furnaces, even those of 200-odd tons capacity, require a blowing time of only 25 minutes or so. It is essential to the successful practice of the oxygen steelmaking process that the steel temperature at the end of the blow be held within rather close limits, and that requirement makes it necessary to measure the bath temperature at a time sufficiently in advance of the end of the blow to permit corrective measures to be taken, if required. Heretofore it was necessary to stop the blow, turn the vessel down so that its mouth could be reached from the operating platform, and measure the bath temperature by thrusting into the vessel through its mouth a long probe carrying a thermocouple at its tip. Although the immersion time required for a temperature measurement by such a thermocouple is only a few seconds, the time required to stop the blow, raise the lance, turn the vessel down, insert the probe, make the measurement and then repeat the steps in reverse order represented a substantial fraction of the blowing time.

It would be highly desirable if a bath temperature measurement could be made without having to turn down the vessel. Accordingly, it is the principal object of my invention to provide method and apparatus for measuring the temperature of the metal in the bath without turning down the converter, or even interrupting the blow. It is another object of my invention to provide such method and apparatus utilizing relatively low cost expendable components. It is still another object to provide method and apparatus which compensate inexpensively for temperature variation of the thermocouple cold junction. Other objects of my invention will become evident in the course of the description thereof which follows.

I measure the temperature of the molten bath in a converter furance by dropping into the furnace through its mouth a body of such weight and shape that it displaces less than its own weight of molten metal when it is immersed a foot or more below the bath surface. Such a body therefore sinks a foot or more below the bath surface, and is called a "sinker" hereinafter. In this sinker, but not shielded from the bath, is a conventional thermocouple capable of measuring the bath temperature. The conventional platinum vs. platinum-rhodium thermocouple is satisfactory for measurement of molten steel temperatures. This thermocouple is connected by insulated lead wires which are not temperature compensated to apparatus outside the vessel which will be described hereinafter. The sinker, thermocouple and lead wires are melted or consumed after a single temperature measurement has been made.

Figure 2:
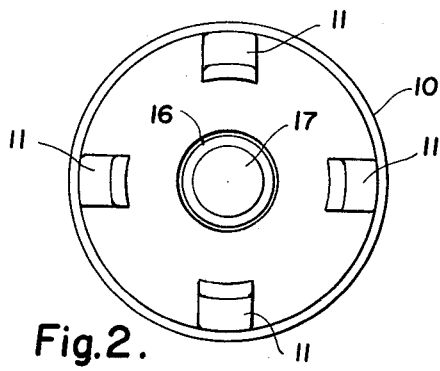
Figure 3:
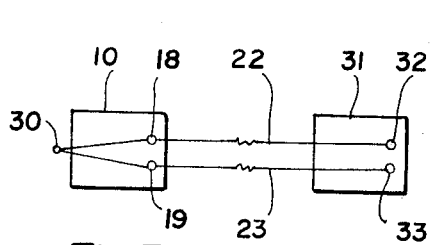
Figure 4:
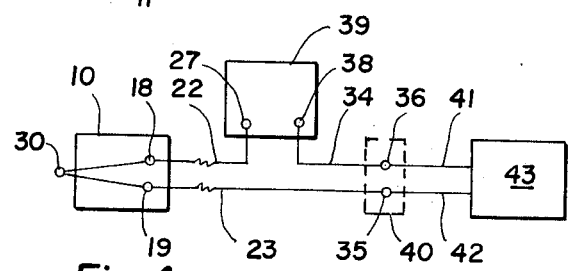

Two embodiments of my invention presently preferred by me are illustrated in the attached figures to which reference is now made. FIGURE 1 is an elevation in section of the sinker and associated apparatus of my invention. FIGURE 2 is a bottom view of the apparatus of FIGURE 1. FIGURE 3 is a schematic of a first arrangement of apparatus which compensates for cold junction temperature variations. FIGURE 4 is a schematic of a second arrangement of apparatus for the same purpose.

Sinker 10 is a cast iron body in the form of an elongated solid of revolution having a low ratio of outside surface area to volume, the axis of revolution being the long axis of the housing. A cylindrical sinker is satisfactory. Sinker 10 as illustrated has a slight draft or taper inwardly from its top 13 to a plane 12 near its bottom, so that it can be cast in a sand mold formed around a pattern which is then removed by pulling upwardly. Below the plane 12 sinker 10 terminates in four spaced legs 11—11 arranged symmetrically around its circumference. Sinker 10 is 3½ inches in diameter at plane 12, 3⅞ inches in diameter at its top 13 and 4⅛ inches long from plane 12 to its top 13. Legs 11—11 are 1½ inches long. Sinker 10 has an axial bore 14 which is ⅝ inch in diameter and extends from its top 13 a distance of 3 inches, where it widens into a bore 15 of 1⅛ inches in diameter, which, in turn extends to plane 12.

Within bore 15 and extending upwardly into bore 14 and downwardly into the open space between legs 11—11 is a housing 16 having a downwardly extending portion 17 within which is positioned a conventional platinum vs. platinum-rhodium thermocouple for sensing the temperature of the molten bath is noted. The thermocouple is not shown in FIGURE 1. Its hot junction is indicated schematically at 30 in FIGURES 3 and 4. The thermocouple wires are connected to terminals 18 and 19 respectively which are carried by the upper end 20 of housing 16. It will be understood that the wires forming the thermocouple need not themselves extend to terminals 18 and 19 but may be connected to those terminals by wires of less expensive material. If this is the case, those intermediate wires must be of temperature compensated material as is known to the art, so that the cold junction of the thermocouple is at terminals 18 and 19. Housing 16 containing a thermocouple as I have described is a commercially available unit commonly used for probe type temperature measuring instruments, and itself forms no part of my invention. Housing portion 17 is constructed so as to protect the thermocouple from mechanical damage prior to its use, but is almost immediately melted by the bath when it is immersed therein.

Sinker 10, dimensioned as I have indicated and made of grey cast iron, together with its thermocouple housing 16 weighs about 10 pounds and will sink several feet into molten steel at a temperature approaching 3,000° F.

Insulated wire leads 22 and 23 are connected to terminals 18 and 19 respectively and are protected by a further insulating jacket so as to form a cable 24. Sinker 10 at the upper end of its bore 14 is provided with a conventional strain bushing 25 through which cable 24 passes and which causes the weight of sinker 10 to be supported by that portion of cable 24 extending outwardly from bushing 25. Other conventional means of strain relief are also satisfactory. Cable 24 is long enough to extend from below the level of the bath in the converter furnace out the mouth of the vessel to a point where it is connected with the remainder of my apparatus to be described. Cable 24 itself is of the order of 45 feet in length. The wire leads 22 and 23 are not temperature compensated but are both ordinary stranded copper wire.

In a first preferred embodiment of my invention leads 22 and 23 are connected at their far ends to a pair of terminals 32 and 33 positioned in the bore of a sinker 31 which is a duplicate of sinker 10. This connection is shown schematically in FIGURE 3. Terminals 32 and 33 are supported inside sinker 31 by any convenient insulating means and are in turn connected to a conventional temperature indicating or recording device not shown, by conventional temperature compensated leads whereby the temperature of the molten bath is noted.

In a second preferred embodimnet of my invention, the platinum plus 10% rhodium wire of thermocouple junction 30 is connected to terminal 18, and the platinum wire to terminal 19. Lead 22 at its far end is connected to terminal 27 of an adjustable source of direct voltage 39. The other terminal 38 of that source 39 is connected by an uncompensated conductor 34 to a terminal 36. Lead 23 at its far end is connected to a terminal 35. Terminals 35 and 36 are positioned in a chamber 40 which is maintained at a controlled temperature. Preferably chamber 40 is maintained at the temperature of 32° F., the temperature of melting ice. Source 39 is connected in series-aiding relationship with thermocouple terminals 18 and 19. A conventional temperature indicator or recorder 43 is connected to terminals 35 and 36 by conventional temperature compensated leads 42 and 41 respectively.

The operation of my apparatus and the process of my invention will first be described with reference to the first preferred embodiment shown schematically in FIGURE 3. Sinker 10, containing thermocouple junction 30, and duplicate sinker 31 are placed together at any convenient location on the operating platform and are allowed to remain there until the two sinkers come to the same temperature, which normally will be the temperature of the ambient atmosphere at that location. The temperature of cold junction terminals 18 and 19 of the thermocouple in sinker 10 is thus the same as that of terminals 32 and 33 in sinker 31, which temperature is the temperature of sinkers 10 and 31. In a steel plant the ambient temperature may change considerably in a period of minutes, but the two sinkers respond to such changes at the same rate so that no temperature difference develops between the two sets of terminals 18–19 and 32–33 and the sinker 31 thus acts as a means for offsetting the effect of the pair of cold junction terminals 18 and 19 on the temperature measuremnt made of the molten bath as noted by the temperature indicator.

Sinker 10 is then lowered by cable 24 into the converter furnace where it sinks below the surface of the bath a foot or more. The hot junction 30 of the thermocouple rapidly reaches bath temperature just as it would if it were thrust into the bath on a conventional probe. Terminals 18 and 19, the cold junction of the thermocouple, being inside sinker 10 which has considerable thermal inertia, do not begin to rise appreciably in temperature for a considerable number of seconds—a time interval sufficient to allow hot junction 30 to reach bath temperature. The thermocouple, therefore, generates a voltage proportional to the temperature difference between hot junction 30 and cold junction 18 and 19. As terminals 18 and 19 were initially at the same temperature as terminals 32 and 33, and remain so during the interval of measurement, the cold junction of the thermocouple is transferred to terminals 32 and 33 on the operating platform. The use of uncompensated leads 22 and 23 does not, therefore, introduce any error in temperature measurement, which is obtained by applying the voltage appearing between terminals 32 and 33 to a conventional temperature indicator or recorder by means of conventional temperature compensated leads.

In the embodiment of FIGURE 4, adjustable voltage source 39 takes the place of duplicate sinker 31 of my first embodiment above-described. Terminals 35 and 36 are maintained at a constant temperature as has been mentioned. The temperature of sinker 10 is measured by an ordinary thermometer just before the sinker is to be used and adjustable source 39 is then adjusted to furnish a voltage equal to that which would be generated by a platinum vs. platinum-rhodium thermocouple having a cold junction temperature of the constant temperature above-mentioned and a hot junction temperature equal to the measured temperature of sinker 10 whereby it acts as a means for offsetting the effect of the pair of cold junction terminals 18 and 19 on the temperature measurement made of the molten bath as noted by the temperature indicator. Sinker 10 is then lowered into the bath and the voltage appearing between terminals 35 and 36 is applied to a conventional temperature indicator or recorder by means of conventional temperature compensated leads. As in the practice of the first embodiment of my process previously described, the use of uncompensated leads 22 and 23 does not introduce any error in temperature measurement. There is no difference in the accuracy of results obtained by the two embodiments of my invention which I have described. The voltage corresponding to the temperature difference between the measured temperature of sinker 10 and a known constant temperature is the electrical equivalent of duplicate sinker 31.

I have made repeated comparisons between bath tempertures obtained by the methods and apparatus herein described and temperatures of the same baths determined at substantially the same times by conventional probe thermocouples. Over the temperature range of about 2890° F. to about 2975° F., the differences between my temperature measurement and those made by prior art devices normally did not exceed 10° F.

I have found that in baths of molten ferrous metal under a slag cover an appreciable temperature gradient exists in the slag-metal interface and bath immediately below. Temperature measurements truly representative of the bath must be made at regions well below the bath surface, preferably a distance of a foot or so, or errors as much as 50° F. will result. The sinker I have here described and illustrated will penetrate several feet below the surface of the bath in a basic oxygen steelmaking furnace and is the most economical in size, shape and material for this purpose. A heavier sinker will provide satisfactory temperature measurement, but is more cumbersome and less economical to use.

In the foregoing description I have referred to temperature compensated thermocouple leads. These are well known to the art, and in effect transfer the cold junction of the thermocouple to a point remote from the source of temperature being measured so that a constant cold junction temperature can be maintained. The compensating leads are made of material less expensive than the elements of the thermocouple. The material of a temperature compensated lead to be connected to the platinum plus 10% rhodium wire of a conventional platinum vs. platinum-rhodium thermocouple is copper and the material of the temperature compensated lead to be connected to the platinum wire of the thermocouple is an alloy known as "No. 11 alloy." The No. 11 alloy wire is several times as expensive as a copper wire of the same diameter and its cost is a significant portion of the total cost of the measurement made using an expendable sinker, an expendable thermocouple, and expendable leads. My invention, which makes possible the use of uncompensated lead wires, thus brings about a significant reduction in the cost of making a bath temperature determination.

The leads 22 and 23 of my apparatus carry only small currents. Their size is thus determined only by their thermal capacity. They must remain below melting temperature until the thermocouple has reached bath temperature and the temperature indicating or recording device connected to them has functioned. I find that a cable 24 unprovided with any special high temperature insulation for leads 22 and 23 is satisfactory if the leads are of 16 B & S gauge copper wire or larger. Wire of that gauge has a nominal diameter of .0508 inch.

Those skilled in the art are also aware that the controlled temperature at which terminals 35 and 36 of the embodiment of my invention illustrated in FIGURE 4 are maintained may be a low temperature as I have described or a temperature above that of the ambient atmosphere. The cold junction temperature is merely a reference point and is "cold" only with respect to the temperature of the thermocouple hot junction. Those skilled in the art will also recognize that lead 42 of my FIGURE 4 is an alloy wire and lead 41 is a copper wire. Thus terminal 36 joins copper wire 34 with copper wire 41, which junction will generate no thermoelectric voltage. With such connections only terminal 35 need be held at a constant known temperature.

In the foregoing I have referred to sinker 31 as being a duplicate of sinker 10. It is not necessary that sinker 31 duplicate precisely the size and shape of sinker 10. It is sufficient if sinker 31 has substantially the same thermal capacity and thermal inertia as sinker 10, so that changes in the temperature of the ambient atmosphere cause its temperature to change in the same way and to the same extent as that of sinker 10, and the term "duplicate" has this significance in my specification and appended claims.

I claim:

1. Apparatus for measuring the temperature of a molten bath comprising an expendable sinker, the sinker being of a material and shape such that it displaces less than its own weight of the bath when immersed to a depth of about a foot therein, a temperature indicator for noting the temperature of the molten bath, a thermocouple mounted within the sinker for sensing the temperature of the molten bath, a pair of expendable uncompensated lead wires connected to the thermocouple within the sinker to form a pair of junctions, said junctions affecting the temperature noted by the temperature indicator, said lead wires being of a length adapted to extend out of the bath when the apparatus is immersed therein, means for offsetting the effect of said pair of junctions on the temperature noted by the temperature indicator so as to eliminate the error introduced into the temperature measurement by said pair of junctions, said means being connected to the ends of said lead wires remote from the sinker and to the temperature indicator.

2. The apparatus of claim 1 in which said offsetting means comprises a duplicate sinker surrounding the remote ends of said lead wires.

3. The apparatus of claim 1 in which said offsetting means includes an adjustable voltage source connected in series with the remote ends of said lead wires.

4. The method of measuring the temperature of a molten bath comprising bringing to a common temperature outside the bath an expendable sinker of a weight and shape such that it displaces less than its own weight of the bath when immersed to a depth of about a foot therein, provided with a thermocouple, and a duplicate sinker unprovided with a thermocouple, the thermocouple being connected within the expendable sinker to a pair of uncompensated lead wires which are connected at their other ends within the duplicate sinker to a pair of terminals, dropping the expendable sinker into the bath while maintaining the duplicate sinker at substantially the common temperature outside the bath, and measuring the voltage at the terminals within the duplicate sinker.

5. The method of measuring the temperature of a molten bath comprising measuring the temperature outside the bath of an expendable metal sinker of a weight and shape such that it displaces less than its own weight of the bath when immersed to a depth of about a foot therein, provided with a thermocouple, the thermocouple being connected within the sinker to a pair of uncompensated lead wires, the other ends of those lead wires being connected to terminals outside the bath in series with an adjustable voltage source, maintaining those terminals at a predetermined cold junction temperature, adjusting the adjustable voltage source to a voltage corresponding to that developed by the thermocouple at the measured temperature of the expendable sinker with reference to the predetermined cold junction temperature, dropping the expendable sinker into the bath, and measuring the voltage at the terminals outside the bath.

References Cited

UNITED STATES PATENTS

| 2,864,878 | 12/1958 | Dalglish | 136—229 |
| 2,999,121 | 9/1961 | Mead | 73—359 |
| 3,011,005 | 11/1961 | Silver | 73—359 |
| 3,277,716 | 10/1966 | Cox | 73—359 |

OTHER REFERENCES

Marsh, K., "Temperature Measurements in Molten Aluminum and Its Alloys." In "Metals Handbook, 3rd edition (1939), pages 1298–1301.

LOUIS R. PRINCE, *Primary Examiner.*

N. B. SIEGEL, *Assistant Examiner.*